United States Patent Office 3,452,088
Patented June 24, 1969

3,452,088
TEREPHTHALIC ACID RECOVERY
George P. Olsen, Hammond, Ind., and Philip H. Towle, Chicago, and Richard H. Baldwin, Oak Lawn, Ill., assignors to Standard Oil Company, Chicago, Ill., a corporation of Indiana
No Drawing. Continuation-in-part of application Ser. No. 456,219, May 17, 1965. This application July 11, 1966, Ser. No. 564,002
Int. Cl. C07c 63/26; B01d 9/02
U.S. Cl. 260—525                                    3 Claims

ABSTRACT OF THE DISCLOSURE

Recovery of terephthalic acid solute as fiber-grade product from solvent water also containing 500 to 6000 parts per million of p-toluic acid based on terephthalic acid solute by precipitation from solution substantially saturated with terephthalic acid at a temperature of 392° to 700° F. by evaporative cooling conducted by batchwise or continuous operation to a temperature in the range of 250° to 300° F. and pressure to maintain solvent water in liquid phase.

---

This invention relates to the recovery of terephthalic acid from aqueous solutions thereof and more specifically pertains to recovery of terephthalic acid dissolved in water at elevated temperature by crystallization produced by controlled-rate evaporative cooling.

This application is a continuation-in-part of our earlier filed application Ser. No. 456,219, filed May 17, 1965.

In our parent application we have disclosed the purification of aromatic polycarboxylic acids derived from catalytic liquid phase oxidation of polyalkyl aromatic hydrocarbons to the degree required for the direct reaction of said polycarboxylic acids with diols to form super polyesters. That degree of purity, in general, is above 99.9 percent by weight. In general, the process of our parent application starts with a crude aromatic polycarboxylic acid of 99.0 to 99.5% purity on a weight base. The crude polycarboxylic acid is dissolved in water, the resulting solution is contacted in the presence of hydrogen with a noble metal-containing catalyst under mild hydrogenation conditions avoiding reduction of the aromatic rings, the hydrogen treated solution is filtered to remove suspended solids and degassed, and then the purified aromatic polycarboxylic acid is recovered by crystallization employing controlled rate evaporative cooling. We taught in our parent application that crystallization by controlled-rate evaporative cooling can be conveniently carried out in a batchwise operation or a continuation operation. In either operation filtered, degassed (hydrogen and other gases removed) aqueous solution is cooled by high rate evaporation of water. The cooling and water removal produces crystallization of purified aromatic polycarboxylic acid. The crystalline aromatic polycarboxylic acid is then separated and recovered from the resulting slurry of crystals in water by means for separating solids from liquids, such as, by filtration, centrifugation and the like, at atmospheric pressure.

We described the continuous crystallization using the controlled rate evaporative cooling as being conducted in the following manner with respect to purified terephthalic acid dissolved in water at a temperature in the range of 392 to 700° F. and a pressure to maintain water in the liquid phase. Such a solution at the elevated temperature is flashed across an inlet valve to a first stirred crystallizer to a lower pressure. Cooling is accomplished by the vaporization of water. This vaporized water is removed from the first crystallizer and is condensed. The resulting cooled aqueous mixture is held in the first crystallizer at the elevated temperature and pressure lower than those of the feed solution until about 30 percent of the originally dissolved terephthalic acid as crystallized.

The slurry formed in the first stirred crystallizer is flashed to lower pressure across an inlet valve to a second stirred crystallizer. Further cooling is accomplished by evaporation of more solvent water. This water vapor is removed from the second crystallizer and condensed. The resulting cooled and depressurized aqueous mixture is stirred and held in the second crystallizer until about 98 percent of the originally dissolved terephthalic acid is in crystalline form.

The slurry formed in the second crystallizer is flashed across an inlet valve into a third crystallizer at a still lower pressure. Water is again evaporated, water vapor removed and condensed. The resulting cooled aqueous mixture is held in this third crystallizer until substantially all of the originally dissolved terephthalic acid is in crystalline form. This third slurry is charged to a centrifuge feed or filter feed tank and held there at atmospheric pressure. The slurry is at a temperature just below the boiling point of water at atmospheric pressure or at a lower temperature.

We described batchwise operation as being carried out in the following manner with respect to purified terephthalic acid dissolved in water at 392 to 700° F. and a pressure to maintain water in the liquid phase. The filtered, degassed aqueous solution of purified terephthalic acid at the elevated temperature and pressure is alternately charged to one of three stirred crystallizers pressurized with steam to about the pressure of the aqueous solution of terephthalic acid. The crystallizers are pressurized with steam prior to receiving the aqueous solution at elevated temperature and pressure to prevent flashing of water vapor from the aqueous solution in an empty crystallization vessel. After a crystallizer has received its charge of aqueous solution of terephthalic acid, feed to that crystallizer is shut off, and then water vapor is vented from the crystallizer through a condenser. The venting of water vapor is controlled for the first 15 minute to provide the cooling required to crystallize about 1.5 pounds acid per 100 pounds of water per minute. Thereafter cooling is controlled to prevent shock cooling with the consequent formation of an excessive amount of infinitesimal crystals and also to prevent inclusion within aromatic polycarboxylic acid crystals as they form of dissolved impurities. The resulting slurry of aromatic polycarboxylic acid crystals is charged to the centrifuge feed or filter feed tank operated at atmospheric pressure.

The catalytic hydrogen treatment of the aqueous solution of crude terephthalic acid disclosed in our parent application does provide for lowering 4-carboxybenzaldehyde in purity from 6000 to 1500 p.p.m. in the crude acid down to 20 to 10 p.p.m. or less in the recovered crystalline terephthalic acid product. Also unidentified materials causing discoloration of crude terephthalic acid are also substantially removed as indicated by decrease of optical density measured at 340 m$\mu$ of 0.31 down to 0.05–0.06. The catalytic hydrogen treatment of the solution of crude terephthalic acid converts a substantial portion of the 4-carboxybenzaldehyde to p-toluic acid and some to benzoic acid. While the terephthalic acid remains dissolved in water after the catalytic hydrogenation, there is, of course, also dissolved in the same water solvent both p-toluic acid and benzoic acid. These three dissolved benzene carboxylic acids have the following solubility characteristics at the temperatures indicated in Table I.

TABLE I.—TEMPERATURE-SOLUBILITY CHARACTERISTICS

[Grams/100 grams H₂O]

| Temperature, °F. | Terephthalic acid | p-Toluic acid | Benzoic acid |
| --- | --- | --- | --- |
| 160 | 0.011 | | 1.9 |
| 200 | 0.023 | 0.355 | 5.8 |
| 250 | 0.068 | 1.8 | |
| 300 | 0.21 | 8.0 | |
| 350 | 0.62 | | |
| 365 | 1.0 | | |
| 401 | 5.0 | | |
| 468 | 10.0 | | |
| 498 | 20.0 | | |
| 522 | 30.0 | | |

We are concerned in this application with the problem of recovery of maximum dissolved terephthalic acid having 200 to 100 p.p.m. or less p-toluic acid from an aqueous solution at a temperature of 392 to 700° F. having on a weight basis for each 100 parts water, 5 to 30 parts terephthalic acid and 6000 to 500 p.p.m. p-toluic acid based on terephthalic acid. U.S. Patent No. 2,572,575 is concerned with the removal of p-toluic acid from impure terephthalic acid. U.S. Patent No. 2,838,565 is concerned with the same problem. Thus these two patents are the ones believed to be most pertinent to our problem.

U.S. Patent No. 2,572,575 teaches treating the mixture of terephthalic acid and p-toluic acid with water at 100 to 200° C. under pressure to maintain water in the liquid phase in an extraction step from which partially purified solid terephthalic acid is recovered by filtration at 100 to 200° C. The partially purified terephthalic acid is dissolved in aqueous caustic. This salt solution is acidified to precipitate free terephthalic acid crystals which are recovered by filtration, washed several times with water and dried. The ratio of terephthalic acid to water used in the exemplified water extraction step amounted to 4.4 to 4.8 grams/100 grams of water. The 175° C. (329° F.) extraction temperature or even the maximum 200° C. (392° F.) would not be high enough for 100 grams water to dissolve 4.4 to 4.8 grams terephthalic acid. At 392° F. 100 grams water dissolves about 1.7 grams terephthalic acid. Thus this patent has no teachings in point with respect to recovery of pure terephthalic acid from aqueous solutions also containing dissolved p-toluic acid.

U.S. Patent 2,838,565 teaches heating a mixture of terephthalic acid and p-toluic acid with water to a temperature in the range of 446 to 536° F. and a pressure to maintain water in the liquid phase to form a solution. The solution, according to this patent, must not be cooled to a temperature below 329° F. to crystallize terephthalic acid from the solution. The method for cooling to a temperature not below 329° F. is not disclosed. Exemplification of this process is with a solution formed at 500° F. and 725 p.s.i.g. followed by crystallization at 356° F. and 150 p.s.i.g. This process is said to give terephthalic acid of a purity of 99–100%. Such a crystallization down to 356° F. and 150 p.s.i.g., it is submitted, conducted by removing heat from the solution but not removing any of the solvent water might well provide crystallized terephthalic acid of 99–100% purity.

We have found that flashing a 392 to 700° F. aqueous solution of terephthalic acid and small amounts of p-toluic acid, such as 6000 to 500 p.p.m. p-toluic acid, down to 360 to 330° F. with removal of water vapor and then holding the resulting mixture at 360 to 330° F. for one or more hours followed by filtration at those temperatures provides a separation factor in the range of 2 to 5, i.e., the ratio of dissolved p-toluic acid to p-toluic acid in washed and dried recrystallized terephthalic acid is 2 to 5. Thus flash evaporative cooling added to the purification process of U.S. Patent No. 2,838,565 does not give a purified terephthalic acid having 200 to 100 or less p.p.m. p-toluic acid.

We have discovered, however, that controlled-rate evaporative cooling can be applied to aqueous solutions of terephthalic acid at a temperature in the range of 392 to 700° F. and pressure to maintain water in the liquid phase where such solutions are substantially saturated with respect to dissolved terephthalic acid contaminated with 6000 to 500 p.p.m. p-toluic acid. Our process cools to a temperature of 250 to 300° F. at a pressure of 20 to 55 p.s.i.g. and produces crystallized terephthalic acid having 200 to 100 p.p.m. or less p-toluic acid, a separation factor of at least in the range of 10 to 30. Any of the foregoing techniques retain substantially all, at least 90%, of the dissolved benzoic acid in solution. But retention of benzoic acid as solute has not presented a problem as did the retention of p-toluic acid as solute during crystallization of terephthalic acid from solutions at 392 to 700° F. From an inspection of the solubility characteristics of p-toluic acid in water it would appear that the retention of 6000 to 500 p.p.m. p-toluic acid based on terephthalic acid would present no problem at all at temperatures of 392 to 330° F. or even down to temperatures as low as 250 to 200° F. because evaporative cooling with the removal of 55 to 65% of the original amount of solvent water would still leave adequate water to keep p-toluic acid in solution.

Generally, batchwise cooling by only heat removal from such high temperature and pressure aqueous solutions as here involved is slow. We have disclosed in our parent application that controlled-rate evaporative cooling of 1.5 pounds terephthalic acid per 100 pounds water per minute is an acceptable rate. Controlled-rate evaporative cooling at a rate of 4 to 10° F. per minute is useful for the process of this invention because these rates are acceptable for commercial operation and, moreover, the process of this invention can conveniently use those cooling rates of 4 to 10° F. per minute.

More specifically, our process starts with an aqueous solution at a temperature of 392 to 700° F., desirably at 440 to 575 and preferably at 464 to 550° F., and pressure to maintain water in the liquid phase which solution is substantially saturated with terephthalic acid and 6000 to 500 p.p.m. p-toluic acid based on terephthalic acid. By "substantially saturated" is meant the solution is about 10° F. above the temperature at which first crystals of terephthalic acid form. Said solution is subjected by batchwise or continuous operation to controlled-rate evaporative cooling in one or more stirred crystallization zones which reduce the final temperature suitably down to a temperature in the range of 245 to 300° F., desirably to the range of 255 to 290° F. and preferably to 275 to 285° F. and pressure corresponding to water vapor pressure at those temperatures. The resulting slurry of terephthalic crystals is subjected to liquid-solid separation, such as centrifugation or filtration, or decantation or centrifuge filtration at said final temperatures and pressures of crystallization.

The wet crystalline terephthalic acid product can be washed with water. In some cases water washing is not needed. The use of a plurality of alternately charged crystallizers and a slurry holding vessel for gathering slurry from all the crystallizers will provide a supply of feed slurry for continuous liquid-solid separation. Water washing for such a continuous liquid-solid separation is best conducted by reslurrying the wet crystalline terephthalic acid with from about 3 to 5 pounds water per pound terephthalic acid at 250 to 300° F. and 20 to 55 p.s.i.g. and then carry out a second liquid-solid separation at 194 to 212° F. and atmospheric pressure. By such a reslurry technique large amounts of purified terephthalic acid can be washed and recovered substantially continuously. The washed purified terephthalic acid is dried. The dried product will have no more than about 100 p.p.m. p-toluic acid and more likely even 50 to 75 p.p.m. and down to 20 p.p.m. (present limit of detectability) p-toluic acid.

According to the process disclosed in our parent application the crude terephthalic acid is first dissolved in demineralized water, and this solution is contacted with hydrogen and catalyst. The water used for washing in this improvement for that process is preferably also demineralized water. The aqueous mother liquors from both liquid-solid separations from the process of this invention can be recycled, in the manner taught in our parent application, to be used as solvent to dissolve crude terephthalic acid to be purified.

The following examples are given to illustrate the improvement attained by the crystallization process of this invention.

A series of batch crystallizations were conducted using aqueous solutions of purified terephthalic acid obtained by contacting aqueous solutions of crude terephthalic acid with hydrogen and catalyst. Cooling of the solution subjected to batch crystallization was accomplished by evaporative cooling controlled at about 4° F. per minute. That is, water was vaporized from the surface of the solution, the water vapor condensed and the condensate returned to the solution. In this series of controlled rate evaporative cooling conducted batchwise, cooling to temperatures in the range of 212 to 300° F. was permitted. In some of these batch crystallizations where cooling to a temperature above 212° F. and a pressure above atmospheric pressure (0 p.s.i.g.) was practiced, flashing to 0 p.s.i.g. and 212° F. during filtration was also carried out. Both controlled rate evaporative cooling to 212° F. and ed continuously with a degassed aqueous solution of purified terephthalic acid (after contact with hydrogen and catalyst) recovered at 515° F. and 870 p.s.i.g. from a surge tank. This degassed solution is charged continuously to a first crystallizer below liquid level in the slurry therein maintained at 268° F. to 309° F. and 20 to 50 p.s.i.g. The water vapor is condensed and the condensate is returned to the first crystallizer. The slurry from the first crystallizer is charged continuously below the liquid level in a second crystallizer operated at 212° F. and 0 p.s.i.g., used for comparative purposes. The second crystallizer supplies continuously a slurry of terephthalic acid in water to a centrifugal filter operated at 210° F. and 0 p.s.i.g. to recover terephthalic acid. This terephthalic acid is washed and dried. The residence time in the first crystallizer is about two hours. During operation of this process a portion of slurry of terephthalic acid in water is also withdrawn continuously from the first crystallizer through a sparkler filter operated at 268 to 309° F. and 20 to 50 p.s.i.g. to illustrate the process of this invention. This recovered terephthalic acid is also washed and dried. The same washing and drying procedures are used for the differently recovered products. The two differently recovered dried terephthalic acid products are designated "210° F. filtered product" and "pressure filtered product." The difference in p-toluic acid content in these two different recovered terephthalic acid products is demonstrated by data shown in Table II.

TABLE II

| Example | Feed solution | | | Filtration | | | | | | Product p-Ta ppm | |
|---|---|---|---|---|---|---|---|---|---|---|---|
| | Temp., °F. | Press., p.s.i.g. | p-Ta, p.p.m. | 1st crystallizer | | Sparkler filter | | Centrifugal filter | | 210° filtered | Pressure filtered |
| | | | | Temp., °F. | Press., p.s.i.g. | Temp., °F. | Press., p.s.i.g. | Temp., °F. | Press., p.s.i.g. | | |
| 6 | 515 | 870 | 380 | 309 | 50 | 309 | 50 | 212 | 0 | 93 | 66 |
| 7 | 515 | 870 | 380 | 273 | 25 | 273 | 25 | 212 | 0 | 93 | 53 |
| 8 | 515 | 870 | 1,990 | 283 | 30 | 283 | 30 | 212 | 0 | 301 | 77 |
| 9 | 515 | 870 | 1,990 | 268 | 20 | 268 | 20 | 212 | 0 | 285 | 86 |

0 p.s.i.g and a slight flash cooling to 212° F. and 0 p.s.i.g. during filtration, while not a part of the present invention, are given as Comparative Examples. The numbered examples illustrate the process of this invention. The results of these batch crystallizations and their operating conditions are shown in TABLE I where "TA" designates terephthalic acid and "p-Ta" designates p-toluic acid. Separation factor is the ratio of p-Ta in solution to p-Ta in product.

EXAMPLE 10

For comparison, the same apparatus is used as in Examples 6 to 9, but conducting the crystallizations batchwise in the first and second crystallizer. An aqueous solution free of hydrogen at 530° F. and 970 p.s.i.g. is charged into the first crystallizer filled with steam at 530° F. and 970 p.s.i.g. and the solution is cooled by controlled evaporative cooling to 270° F. and 20 p.s.i.g. The resulting slurry is split

TABLE I.—BATCH CRYSTALLIZATION

| Example | Feed solution | | | Filtration | | | Product | |
|---|---|---|---|---|---|---|---|---|
| | Temperature, °F. | Concentration | | Temperature, °F. | Pressure, p.s.i.g. | Flash, °F. | p-Ta, p.p.m.[2] | Separation factor |
| | | TA, lb.[1] | p-Ta, p.p.m.[2] | | | | | |
| 1 | 480 | 9.2 | 1,860 | 245 | 12 | None | 20 | 93 |
| 2 | 480 | 10 | 1,860 | 275 | 30 | None | 20 | 93 |
| 3 | 520 | 25 | 500 | 275 | 30 | None | 20 | 50 |
| 4 | 520 | 25 | 1,500 | 275 | 30 | None | 20 | 25 |
| Comparative 1 | 520 | 25 | 1,500 | 300 | 0 | [3] 88 | 170 | 8.8 |
| Comparative 2 | 520 | 25 | 1,500 | 235 | 0 | [3] 23 | 79 | 19.0 |
| Comparative 3 | 520 | 25 | 1,500 | 212 | 0 | None | 70 | 21.5 |
| 5 | 520 | 25 | 1,500 | 255 | 18 | None | 29 | 52 |

[1] Lb./100 lb. H₂O.  [2] P.p.m. based on TA.  [3] Flash cooling to 212° F. and 0 p.s.i.g.

Comparative 1 illustrates that cooling to 300° F. during crystallization and flashing to 212° F. and 0 p.s.i.g. during filtration defeats the purpose of controlled rate evaporative cooling. Controlled rate evaporative cooling to 235° F. and then flashing only 23° F. to 212° F. and 0 p.s.i.g. (Comparative 2), while affording some improvement over Comparative 1, still does not provide any improvement over controlled rate evaporative cooling to 212° F and 0 p.s.i.g. before filtration (Comparative 3). Excellent results, however, are obtained by controlled rate evaporative cooling to 245 to 275° F. and 12 to 30 p.s.i.g. and filtering under those conditions according to the process of this invention.

According to this invention crystallization is operated into a major portion and a minor portion. The major portion is charged to the second crystallizer and cooled by controlled evaporative cooling to 212° F. and 0 p.s.i.g. and at the same time the minor portion of the slurry is charged at 270° F. and 20 p.s.i.g. through a sparkler filter. The terephthalic acid crystalline product in the second crystallizer is recovered by a centrifuge, washed and dried. The terephthalic acid crystalline product recovered by the sparkler filter is washed and dried. The same weight ratio of water to crystalline product is used in each washing procedures. The starting feed for crystallization contained about 2000 p.p.m. p-toluic acid based on terephthalic acid. The dry terephthalic acid from the pressure filtration at 270° F. and 20 p.s.i.g. has a p-toluic acid content of 41 p.p.m. and the dry terephthalic acid recovered from the second crystallizer at 210° F. and 0 p.s.i.g. conditions is both the crystallizer and centrifuge has a p-toluic acid content of 161 p.p.m. These two different terephthalic acid recovery methods had separation factors of about 50 and 12.5, respectively, amounting to a four fold difference.

When the results of Examples 6 to 9 are compared to those of Examples 1 to 5 and 10, it will be observed that the benefits of recovering terephthalic acid at the temperature and pressure conditions for final crystallization and solid-liquid separation can be attained in part even though a first modified flash cooling and depressurizing is employed. The separation factors improvement for pressure filtration over 210° F. filtration are: Example 6, 1.4 fold; Example 7, 1.75 fold; Example 8, 3.9 fold and Example 9, 3.3 fold. It will also be noted that the larger improvements are attained with the starting acqueous solutions having greater, about 5 times greater weight ratios of p-toluic acid to terephthalic acid.

EXAMPLE 11

A batchwise crystallization conducted with an aqueous solution having 20 pounds terephthalic acid per 100 pounds water and a weight ratio of p-toluic acid of 3000 p.p.m. based on terephthalic acid. This solution is cooled from 520° F. and 880 p.s.i.g. (solution recovered after removal of hydrogen) to 275° F and 26 p.s.i.g. by controlled rate evaporation at 4° F. per minute. The resulting slurry of terephthalic acid crystals is separated at 275° F. and 26 p.s.i.g. by solid-liquid separation. The recovered terephthalic acid is dried without a water wash. The dried product has a p-toluic acid content of 26 p.p.m. which represents separation factor of 115.

EXAMPLE 12

The process of Example 11 is repeated except that the cooling rate is 10° F. per minute and the final temperature is 280° F. and the final pressure is about 28.5 p.s.i.g. The resulting slurry is filtered at 280° F. and 28.5 p.s.i.g. The recovered dried product has a p-toluic acid content of 47 p.p.m. which represents a separation factor of about 64.

In contrast to Examples 11 and 12, the same starting aqueous solution cooled to 212° F. at 10° F. per minute and 4° F. per minute by controlled rate evaporative cooling produced dried terephthalic acid products having 200 and 130 p.p.m. p-toluic acid, respectively, which represents separation factors of 15 and 23.1. When these results are compared with those of Examples 12 and 11, the two different modes of recovery using the same 4° and 10° F. cooling rates produce separation factor advantages of about 7.8 and 2.9 fold in favor of the final crystallization and separation at 275–280° F. and 26–28.5 p.s.i.g.

The advantages of the crystallization and separation technique of this invention can be substantially obtained by batchwise or continuous operation when the initial aqueous feed solution is flashed across a pressure reducing valve while charging the feed solution at the high temperature and pressure into and below the liquid in the crystallization step. Such flashing can provide a small pressure drop in the range of about 20 to 100 pounds per square inch. The use of such flashing while charging the hot pressurized solution to crystallization can be advantageously employed to shorten somewhat the final cooling period.

What is claimed is:

1. In the recovery of crystalline terephthalic acid from an aqueous solution at a temperature of 392 to 700° F. and a pressure to maintain water in the liquid phase substantially saturated with terephthalic acid solute and having 6000 to 5000 p.p.m. p-toluic acid based on terephthalic acid by crystallization obtained by controlled-rate evaporative cooling; the improvement comprising cooling said solution by controlled-rate evaporative cooling from said temperature in the range of from 392 to 700° F. to a temperature in the range of about 250 to 300° F. and a pressure to maintain solvent water in the liquid phase and recovering terephthalic acid crystalline product by solid-liquid separation at a temperature in the range of 250 to 300° F. and at a pressure to maintain water in the liquid phase.

2. The process of claim 1 wherein the final crystallization temperature and the solid-liquid separation temperature are both in the range of from 255 to 290° F.

3. The process of claim 1 wherein the final crystallization temperature and the solid-liquid separation temperature are both in the range of 275 to 285° F.

References Cited

UNITED STATES PATENTS

| | | | |
|---|---|---|---|
| 2,848,488 | 8/1958 | Himel et al. | 260—525 |
| 2,894,985 | 7/1959 | Grantham et al. | 260—525 |

FOREIGN PATENTS 545,511   8/1956   Belgium.

LORRAINE A. WEINBERGER, *Primary Examiner.*

J. H. NIELSEN, *Assistant Examiner.*

PO-1050
(5/69)

UNITED STATES PATENT OFFICE
CERTIFICATE OF CORRECTION

Patent No. 3,452,088          Dated June 24, 1969

Inventor(s) George P. Olsen; Philip H. Towle and Richard H. Baldwin

It is certified that error appears in the above-identified patent and that said Letters Patent are hereby corrected as shown below:

Column 1, line 52, the word "continuation" should be -- continuous --; and Column 8, line 21 "5000 p.p.m." should be -- 500 p.p.m. --.

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents